No. 730,582. PATENTED JUNE 9, 1903.
C. P. STEINMETZ.
ARMATURE FOR DYNAMO ELECTRIC MACHINES.
APPLICATION FILED AUG. 16, 1899.
NO MODEL.

Witnesses.
Arthur H. Abell.
Benjamin B. Hull.

Inventor.
Charles P. Steinmetz,
by Albert G. Davis
Atty.

No. 730,582. Patented June 9, 1903.

UNITED STATES PATENT OFFICE.

CHARLES P. STEINMETZ, OF SCHENECTADY, NEW YORK, ASSIGNOR TO THE GENERAL ELECTRIC COMPANY, A CORPORATION OF NEW YORK.

ARMATURE FOR DYNAMO-ELECTRIC MACHINES.

SPECIFICATION forming part of Letters Patent No. 730,582, dated June 9, 1903.

Application filed August 16, 1899. Serial No. 727,374. (No model.)

*To all whom it may concern:*

Be it known that I, CHARLES P. STEINMETZ, a citizen of the United States, residing at Schenectady, county of Schenectady, State of New York, have invented certain new and useful Improvements in Armatures for Dynamo-Electric Machines, of which the following is a specification.

The armatures of induction-motors are ordinarily designed so as to have low resistance, and thus secure close speed regulation and high efficiency. When thus designed, however, the torque of the motor at starting is comparatively small and the machine therefore unsuitable for use in cases where it is required to start under load. Various expedients have been resorted to in order to secure large starting torque and at the same time to obtain high efficiency under normal load. The present invention accomplishes this result by providing the armature or induced member with a plurality of windings, one at least of which is of the squirrel-cage type and of comparatively high resistance. At starting all of the windings of the induced member of the motor are open except the squirrel-cage winding. As soon as the motor gathers speed, however, the other winding or windings of the induced member are successively closed.

For a more complete understanding of my invention reference is to be had to the following description, taken in connection with the accompanying drawings.

The scope of the invention is to be determined by consideration of the appended claims.

Figure 1:
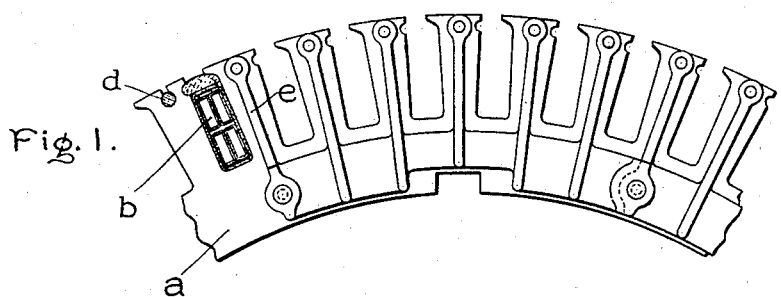
Figure 2:
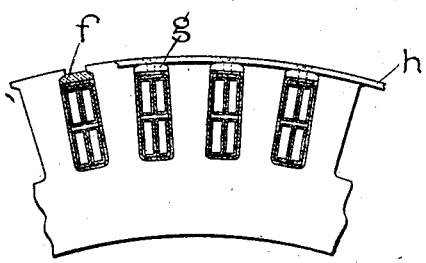

Figure 1 of the drawings illustrates a small section of an induction-motor armature provided with a distributed winding and with a winding of the squirrel-cage type. Fig. 2 shows a modified form of squirrel-cage, and Fig. 3 illustrates the windings diagrammatically.

In Fig. 1, $a$ represents a section of the toothed core of an induction-machine, the core being of the type commonly employed in practice. At $b$ in the slot between one of the pairs of teeth I have shown a section of the conductors forming a part of a distributed winding of the ordinary type employed in machines of this character. It is of course to be understood that windings are to be placed in all of the slots of the machine; but for simplicity in the drawings I have shown all of the slots vacant except one. Wooden wedges are driven under the undercut ends of the armature-teeth and bear upon and hold the armature-conductors in place in the ordinary manner. In addition to the winding thus described I provide conductors connected together at their ends in order to form a squirrel-cage. In Fig. 1 these conductors are shown as bars or rods $d$, embedded in suitably-shaped grooves in the ends of the armature-teeth, the ends of the conductors being riveted or otherwise secured to fingers $e$, which form integral parts of clamping-plates or space-blocks used for holding together the laminæ of the armature-core.

The construction shown in Fig. 2 differs from that illustrated in Fig. 1 in that the bars which form the conductors of the squirrel-cage act also as wedges for securing the conductors of the distributed winding in place in the slots of the armature-core. One of these conductors is indicated in section at $f$ and another in end view at $g$. The ends of these conductors are connected together electrically in any desired manner—as, for example, by the use of strips of conducting material $h$ passing across the projecting ends of the conductors and secured thereto by screws or rivets reinforced by soldering or brazing. As thus located the squirrel-cage winding is in close inductive relation to the inducing-winding, thus having a high coefficient of mutual induction and low self-induction. This will be seen to be a particularly important advantage of my invention when it is remembered that the counter magnetomotive force and magnetic leakage are a maximum at starting.

Figure 3:
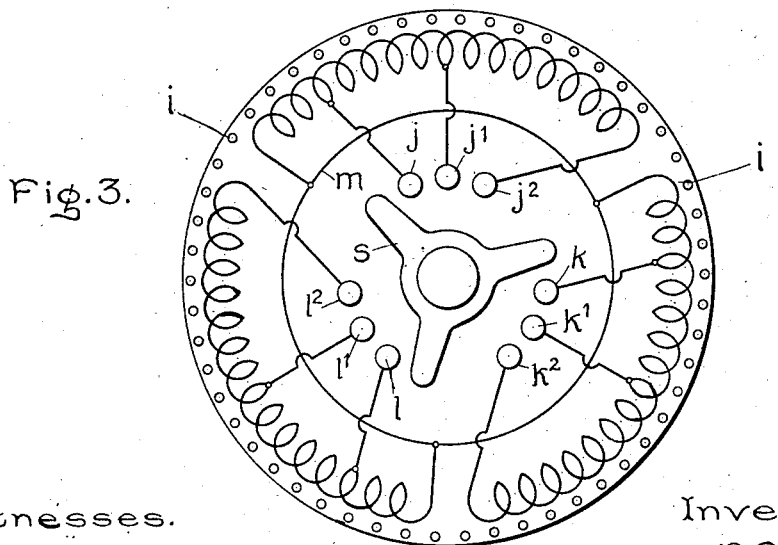

The electrical connections of the different windings are shown in diagram in Fig. 3, in which the small circles $i$ indicate the conductors of the squirrel-cage, while the coils connected to the terminals $j$ $k$ $l$ indicate a single distributed winding. For clearness of illustration this winding is shown in the drawings as consisting of three sections displaced from each other by equal angles and covering separate portions of the core. It is to be understood, however, that this figure is merely explanatory, since in practice the three windings and the various sections of the same are interlaced with each other in a well-known manner, the arrangement of the winding depending upon the number of poles and the number of conductors per pole. One end of each of the windings is, however, connected to a common point, as indicated by the conductor $m$, while from different points in the length of each winding taps are brought out to suitable contact-plates $j$ $j'$ $j^2$ $k$ $k'$, &c., up to $l^2$. A short-circuiting switch of some suitable form—as, for instance, a three-pronged star $s$—is used to connect together corresponding taps of the several sections of winding. Thus in the first position of the switch $s$ the taps $j$, $k$, and $l$ are connected together, thus short-circuiting the first section of each winding, leaving the remaining portions of the winding on open circuit, the latter portions being cut into circuit successively as the switch is moved from one set of contacts to the next. The particular form of switch is immaterial and may conveniently consist of a suitable contact-piece sliding longitudinally upon the shaft of the motor and coöperating with suitable terminals connected to the distributed winding after the manner shown in Fig. 3.

In starting the motor the distributed winding is open-circuited, thus rendering the same inactive, and so making use only of the squirrel-cage winding, which is preferably of comparatively high resistance. After the motor has been started from rest the sections of the distributed winding are cut in one after another, thus increasing the amount of active copper in the induced member, and consequently increasing the ampere-turns, and so approaching the conditions of high efficiency and close speed regulation. When all of the windings have been cut into circuit and all of the copper on the armature becomes active in carrying current, the result secured is equivalent to that which would be obtained by the use of a single winding having the same amount of copper in cross-section, and if the amount of copper employed is sufficient the desired regulation and efficiency may be secured.

Although in the drawings I have shown a rotating armature constituting the induced member of the machine, it will be obvious that the fixed member of the machine may perform the functions of the induced member, while the inducing member is caused to rotate relatively thereto. Wherever, therefore, I use the term "armature" I do not wish the same to be limited in its application to a rotating member of a dynamo-electric machine, since the term is equally applicable to the stationary member.

What I claim as new, and desire to secure by Letters Patent of the United States, is—

1. An armature for an induction-machine having a plurality of electrically-unconnected windings, and means for varying the number of active turns of one of said windings.

2. A cylindrical armature having around the periphery thereof a plurality of windings, one of which is a squirrel-cage winding and another a short-circuited distributed winding.

3. An induced member for an induction-machine having a toothed core and a squirrel-cage winding embedded in the teeth.

4. An induced member for an induction-machine having a toothed core and conductors of a squirrel-cage winding embedded in the ends of the teeth.

5. A dynamo-electric machine having a plurality of windings on one of its members, one of said windings being of the squirrel-cage type, and another of said windings having a variable number of active turns.

In witness whereof I have hereunto set my hand this 14th day of August, 1899.

CHARLES P. STEINMETZ.

Witnesses:
BENJAMIN B. HULL,
MABEL E. JACOBSON.